(12) United States Patent
Xiao

(10) Patent No.: US 12,429,587 B2
(45) Date of Patent: Sep. 30, 2025

(54) TECHNIQUES FOR EQUALIZING POWERS OF MULTIPLE LOCAL OSCILLATOR BEAMS USING OPTICAL ATTENUATORS

(71) Applicant: AEVA, INC., Mountain View, CA (US)

(72) Inventor: Shijun Xiao, Foster City, CA (US)

(73) Assignee: Aeva, Inc., Mountain View, CA (US)

( * ) Notice: Subject to any disclaimer, the term of this patent is extended or adjusted under 35 U.S.C. 154(b) by 849 days.

(21) Appl. No.: 17/713,845

(22) Filed: Apr. 5, 2022

(65) Prior Publication Data
US 2023/0314611 A1 Oct. 5, 2023

(51) Int. Cl.
*G01S 17/34* (2020.01)
*G01S 7/48* (2006.01)
*G01S 7/481* (2006.01)

(52) U.S. Cl.
CPC ............ *G01S 17/34* (2020.01); *G01S 7/4804* (2013.01); *G01S 7/4816* (2013.01); *G01S 7/4817* (2013.01)

(58) Field of Classification Search
CPC ...... G01S 17/34; G01S 7/4815; G01S 7/4917; G01S 7/499
See application file for complete search history.

(56) References Cited

U.S. PATENT DOCUMENTS

2018/0081031 A1* 3/2018 Yuan ................. G01S 7/481

* cited by examiner

*Primary Examiner* — Calvin Y Choi
*Assistant Examiner* — Clara G Chilton
(74) *Attorney, Agent, or Firm* — Womble Bond Dickinson (US) LLP

(57) ABSTRACT

Aspects of the present disclosure provide a LIDAR system including an optical source to transmit at least a first beam and a second beam toward a target, respectively at a first original power level and a second original power level. The LIDAR system further includes an optical attenuator adapted to receive each of the first and the second beams disposed between the optical source and one or more optics. The at least one optical attenuator is to receive a controlled voltage to adjust a polarization of at least one of the first beam or the second beam to a first polarization. The first and the second beams are transmitted toward a corresponding local oscillator resident on the LIDAR system, such that an output of the first beam and an output of the second beam transmitted through the local oscillator are balanced to have a substantially equal power level.

20 Claims, 8 Drawing Sheets

(Front View)

(Side View)

TECHNIQUES FOR EQUALIZING POWERS OF MULTIPLE LOCAL OSCILLATOR BEAMS USING OPTICAL ATTENUATORS

FIELD

The present disclosure is related to light detection and ranging (LIDAR) systems.

BACKGROUND

Lidar systems, such as Frequency-Modulated Continuous-Wave (FMCW) LIDAR systems, use tunable lasers for frequency-chirped illumination of targets, and coherent receivers for detection of backscattered or reflected light from the targets that are combined with a local copy of the transmitted signal (e.g., local oscillator, or LO signal). Mixing the LO signal with the return signal, delayed by the round-trip time to the target and back, generates a beat frequency at the receiver that is proportional to the distance to each target in the field of view of the system.

These LIDAR systems employ optical scanners with high-speed mirrors to scan a field of view (FOV) and to receive target return signals from the FOV. Multiple beams are generally implemented in a LIDAR system to scan multiple lines in a common FOV simultaneously. During the scanning, amplified laser beams may be split into local oscillator (LO) beams, which have different power levels due to different optics in the LIDAR system (e.g., coatings of the optics for each laser beam may be different). The different power levels of the LO beams often negatively impact digital signal processing in the LIDAR system. This problem may be further amplified in long-range LIDAR systems, as each laser beam is intentionally amplified to a maximal available power level for achieving a long range scan, causing subsequent power differences in LO beams problematic for signal processing.

SUMMARY

The present disclosure describes various examples of LIDAR systems and methods for equalizing powers of multiple local oscillator beams.

In one example, a LIDAR system according to the present disclosure includes an optical source to transmit at least a first beam and a second beam toward a target, via one or more optics, the first beam transmitted at a first original power level and the second beam transmitted at a second original power level. The LIDAR system further includes at least one optical attenuator adapted to receive each of the first and the second beams disposed between the optical source and the one or more optics. The at least one optical attenuator is to receive a controlled voltage to adjust a polarization of at least one of the first beam or the second beam to a first polarization. The first and the second beams are transmitted toward a corresponding local oscillator resident on the LIDAR system, such that an output of the first beam and an output of the second beam transmitted through the local oscillator are balanced to have a substantially equal power level. The substantially equal power level may be achieved by lowering one of the first original power level and the second original power level. The LIDAR system further includes an optical receiver adapted to receive at least a respective portion of the first beam and the second beam and a signal processing system. The signal processing system includes a circuitry; and a memory to store instructions that, when executed by the circuity, cause the signal processing system to: calculate a velocity and range of the target based on the respective portion of the first and the second beams In some embodiments, the at least one optical attenuator includes a layer adapted to impede beams having a second polarization different from the first polarization. In some cases, the at least one optical attenuator further comprises a light transmission medium to reduce a power level of the first or the second beam by inducing transmission loss at the layer using birefringence. For example, the light transmission medium may include a pixelate thin liquid crystal (LC) plate. The LC plate may adjust the polarization of the first beam or the second beam using an optical retardation procedure that rotates polarizations of one or more portions of the first or the second beam.

In some embodiments, the LIDAR system may include a processor adapted to apply the controlled voltage, in a closed-loop control, to each optical attenuator for each of the first and the second beams based on feedback received at the optical receiver to maintain a balance of the outputs of the first beam and the second beam transmitted through the local oscillator.

In some embodiments, the at least one optical attenuator comprises at least one of: a liquid crystal optical attenuator, liquid crystal on silicon (LCOS), or micro-electromechanical systems (MEMS).

In one example, a method for determining target information using a LIDAR system includes generating at least a first beam and a second beam by at least one optical source and transmitting the first beam and the second beam via one or more optics toward a target, the first beam transmitted at a first original power level and the second beam transmitted at a second original power level. The method further includes applying a voltage to at least one optical attenuator for each of the first and the second beams disposed between the optical source and the one or more optics to adjust a polarization of at least one of the first beam or the second beam transmitted to a first polarization. The method further includes transmitting the first and the second beams toward a corresponding local oscillator resident on the LIDAR system. The method includes balancing, via the applied voltage, an output of the first beam and an output of the second beam transmitted through the local oscillator to have a substantially equal power level. The substantially equal power level may be lower than at least one of the first original power level or the second original power level. The method further includes receiving, at an optical receiver, at least a respective portion of the first beam and the second beam to calculate a velocity and range of the target.

In some embodiments, the method further includes transmitting, at a layer of the at least one optical attenuator, the output of the first or the second beam toward the optical receiver and block beams having a second polarization different from the first polarization. In some cases, the method further includes reducing a power level of the first or the second beam by inducing transmission loss at the layer using birefringence, wherein the transmission loss is caused by the voltage applied to a light transmission medium of the at least one optical attenuator to change the first polarization.

In some embodiments, the method further includes adjusting, by at least one optical attenuator, the polarization of the first beam or the second beam using an optical retardation procedure that rotates one or more portions of the output of the first or the second beam.

In some embodiments, the voltage may be applied, by a processor, in a closed-loop control. The voltage to each optical attenuator for each of the first and the second beams is determined based on feedback received at the optical receiver to maintain a balance of the outputs of the first beam and the second beam transmitted through the local oscillator.

In one example, a frequency modulated continuous wave (FMCW) LIDAR system includes: at least an optical source to generate a plurality of laser beams to transmit toward a target, an amplifier to increase one or more original power levels of the plurality of laser beams, and a corresponding optical receiver to receive a portion of each of the plurality of laser beams reflected by the target. The FMCW LIDAR system further includes a respective local oscillator disposed between the corresponding optical receiver and the target; and at least one optical attenuator for each of the plurality of laser beams disposed between the optical source and the respective local oscillator. The at least one optical attenuator is to receive a controlled voltage to adjust a polarization of a corresponding one of the plurality of laser beams to a first polarization transmitted toward the respective local oscillator, such that outputs of the plurality of laser beams transmitted through the respective local oscillators are balanced to have a substantially equal power levels. The FMCW LIDAR system further includes a signal processing system that includes a circuitry and a memory to store instructions that, when executed by the circuitry, cause the signal processing system to calculate a velocity and range of the target based on the received portions of the plurality of laser beams.

BRIEF DESCRIPTION OF THE DRAWINGS

For a more complete understanding of the various examples, reference is now made to the following detailed description taken in connection with the accompanying drawings in which like identifiers correspond to like elements.

Like numerals indicate like elements.

DETAILED DESCRIPTION

Figure 1:
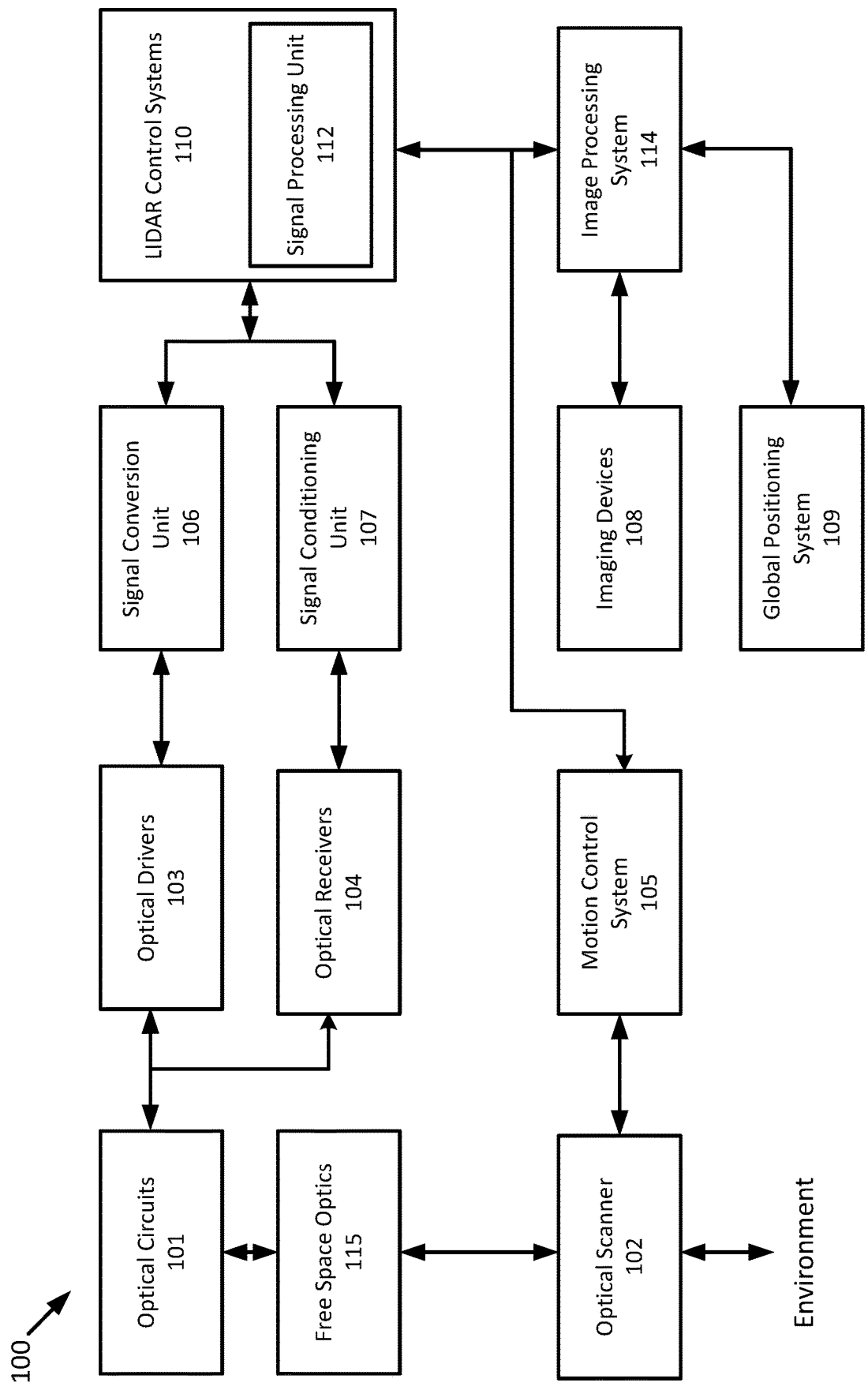
FIG. 1 illustrates an example Frequency-Modulated Continuous-Wave (FMCW) LIDAR system according to embodiments of the present disclosure.

The present disclosure describes various examples of LIDAR systems and methods for equalizing powers of multiple local oscillator beams using optical attenuators. According to some embodiments, the described LIDAR system may be implemented in any sensing market, such as, but not limited to, transportation, manufacturing, metrology, medical, and security systems. According to some embodiments, the described LIDAR system can be implemented as part of a front-end of frequency modulated continuous-wave (FMCW) device that assists with spatial awareness for automated driver assist systems, or self-driving vehicles.

According to aspects of the present disclosure, multiple beams (e.g., local oscillator beams) in a LIDAR system are balanced or equalized for digital signal processing. For example, multiple beams are often implemented in LIDAR systems to scan multiple lines in the field of view simultaneously. A portion of each of the scanning beams may be split into a local oscillator (LO) beam. As LO beam is split from an amplified beam, the LO beam power may vary due to optics including coating for each beam. At the photodetector, a balanced LO beam power level (among multiple LO beams) is important for digital signal processing (DSP).

When the LIDAR system transmits multiple amplified scanning beams, procedures performed by the DSP in the LIDAR system may be subject to negative effects caused by several tenth dB level variation in the LO beam power levels. Unbalanced beam power levels may cause the algorithm to incorrectly detect points and fail to form an accurate point cloud. Furthermore, for long range LIDAR systems, optical amplifiers are often used to obtain sufficient power in the scanning beams (e.g., for targets further away compared to less amplified applications). As such, the beam power balance becomes more critical, as the power level gains may substantially vary among amplifiers, in addition to the variations in other optical components in the LIDAR system. The long-range scanning purpose often requires the scanning beams to be set at maximum power levels.

The present disclosure provides systems, methods, and techniques for independently tuning each LO beam to improve DSP without impacting existing function blocks in the LIDAR system, and avoiding adding tuning mechanisms on photonics chips or laser chips that require additional chip integration that may impact other core functions of the chips. For example, the present disclosure provides a free space (e.g., flexible to be placed in various locations in the LIDAR system without impacting existing optical components) arrayed LO beam power equalizer in a coherent LIDAR system.

The arrayed beam power equalizer is programmable, making it dynamic to balance power among multiple beams. For example, the beam power equalizer may be in a closed-loop control with tailored parameters for each scanning beam. In different implementations, the free space equalizer can be transmissive or reflective. For example, a transmissive beam power equalizer may be integrated into the existing optical beam path in a LIDAR system, such as by placing the beam power equalizer in the respective beam path. A reflective beam power equalizer may be used where space limitations or other considerations limit the use of a transmissive configuration.

In some implementations, the transmissive equalizer is a pixelate patterned liquid crystal (LC) plate coupled with a polarizer. The polarizer allows beams of the same polarization angle to pass through and blocks beams having a polarization angle perpendicular to the polarization angle of the polarizer (and variably attenuates beams having different polarization angles in between). Each pixel (or multiple pixels) in the LC plate may be used to control or affect one LO beam passing therethrough. By tuning the voltage applied to the LC plate (and the corresponding pixel), the optical retardation of the pixel is changed (e.g., rotating the polarization of the beam passing therethrough). The beam with controlled polarization may then pass through the polarizer coupled with the LC plate. As such, the optical power transmission is controlled by the LC plate and the polarizer, which may attenuate the power level by increasing the differences of polarization angles.

According to aspects of the present disclosure, each individual power level equalizer may be referred to as an optical attenuator. Two or more optical attenuators are controlled to perform power equalization in the LIDAR system. In the example above, when the optical attenuator uses an LC plate and a polarizer, the optical attenuator may achieve simple or easy integration into existing optics in a LIDAR system, as the thin assembly of the optical attenuator may be placed in free spaces in a transmissive manner, to be placed in variable locations in the beam path.

Although LC plates and polarizers are used as examples for the disclosed optical attenuator, other arrayed optical devices may also provide optical tuning at a pixel level for beam attenuation at high resolutions, according to aspects of the present disclosure. For example, Liquid Crystal on Silicon (LCOS) or micro-electromechanical systems (MEMS) may also be implemented as the disclosed arrayed optical attenuation device. In such implementations, the optical attenuation may be achieved through beam steering with LCOS or MEMS. Various examples and detailed examples of the optical attenuator of the beam power equalizer are discussed in details below.

LIDAR systems described by the embodiments herein include coherent scan technology that includes the use of transmission lines, one or more sensors, receivers, and at least one local oscillator (i.e., a local copy of the transmission line). A scanning element (e.g., galvo mirror) is used to transmit the beam of light towards targets in the field of view of a sensor used by LIDAR systems described herein. A beam reflected from the target is collected by a lens system and combined with the local oscillator.

FIG. 1 illustrates a LIDAR system 100 according to example implementations of the present disclosure. The LIDAR system 100 includes one or more of each of a number of components, but may include fewer or additional components than shown in FIG. 1. As shown, the LIDAR system 100 includes optical circuits 101 implemented on a photonics chip. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers, non-reciprocal elements such as Faraday rotator or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. The optical scanner 102 also collects light incident upon any objects in the environment into a return optical beam that is returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device such as signal processing unit 112. In some examples, signal processing unit 112 may be one or more general-purpose processing devices such as a microprocessor, central processing unit, or the like. More particularly, signal processing unit 112 may be complex instruction set computing (CISC) microprocessor, reduced instruction set computer (RISC) microprocessor, very long instruction word (VLIW) microprocessor, or processor implementing other instruction sets, or processors implementing a combination of instruction sets. Signal processing unit 112 may also be one or more special-purpose processing devices such as an application specific integrated circuit (ASIC), a field programmable gate array (FPGA), a digital signal processor (DSP), network processor, or the like.

In some examples, signal processing unit 112 is a digital signal processor (DSP). The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LIDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 2:
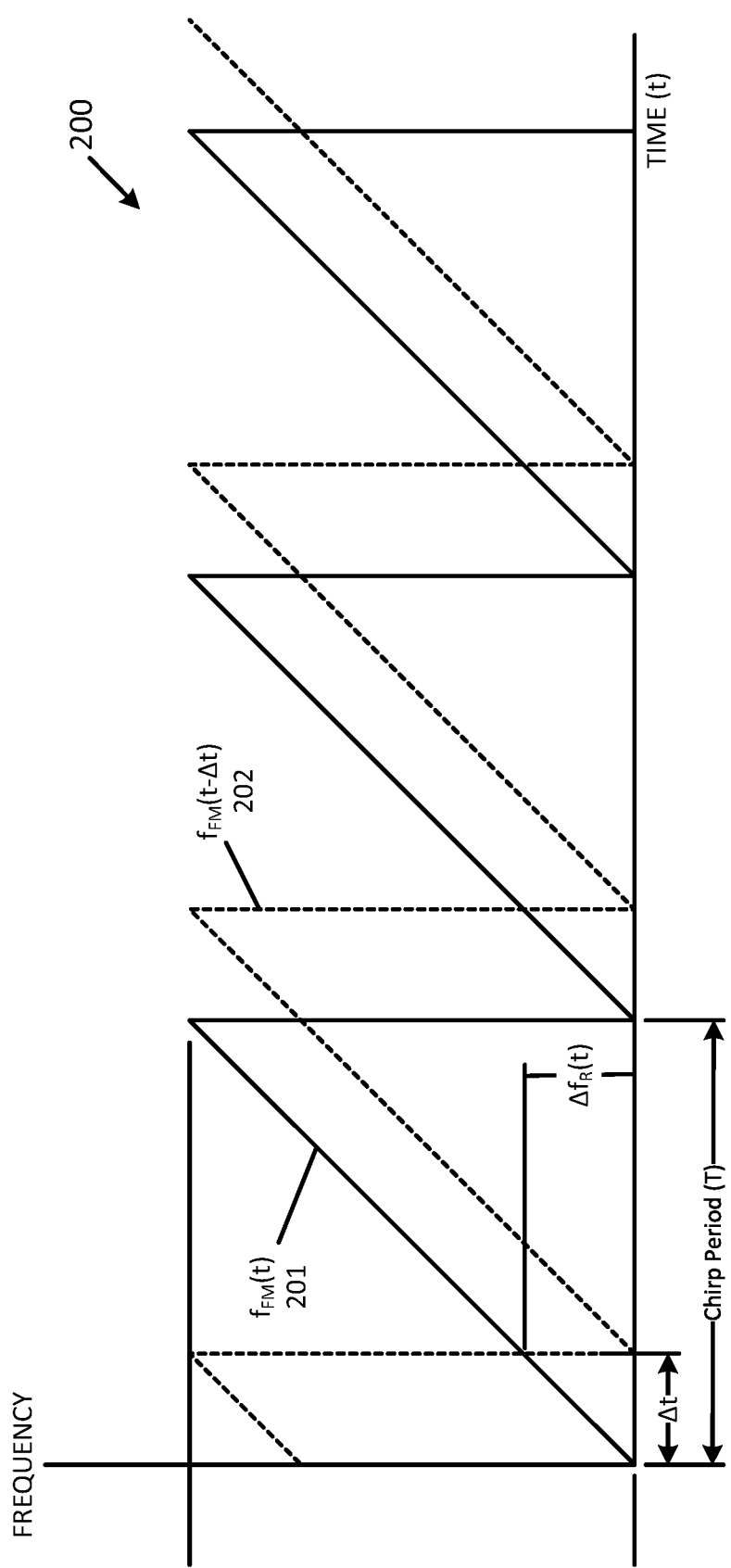
FIG. 2 is a time-frequency diagram illustrating an example of FMCW LIDAR waveforms according to embodiments of the present disclosure.

FIG. 2 is a time-frequency diagram 200 of an FMCW scanning signal 201 that can be used by a LIDAR system, such as system 100, to scan a target environment according to some embodiments. In one example, the scanning waveform 201, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$. FIG. 2 also depicts target return signal 202 according to some embodiments. Target return signal 202, labeled as $f_{FM}(t-\Delta t)$, is a time-delayed version of the scanning signal 201, where $\Delta t$ is the round trip time to and from a target illuminated by scanning signal 201. The round trip time is given as $\Delta t=2R/v$, where R is the target range and v is the velocity of the optical beam, which is the speed of light c. The target range, R, can therefore be calculated as $R=c(\Delta t/2)$. When the return signal 202 is optically mixed with the scanning signal, a range dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR system 100. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max}=(c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner. It should be noted that while embodiments of the present disclosure may be used in conjunction with FMCW LiDAR, the disclosure is not limited to FMCW LiDAR and embodiment may be used with any other form of coherent LiDAR as well.

Figure 3:
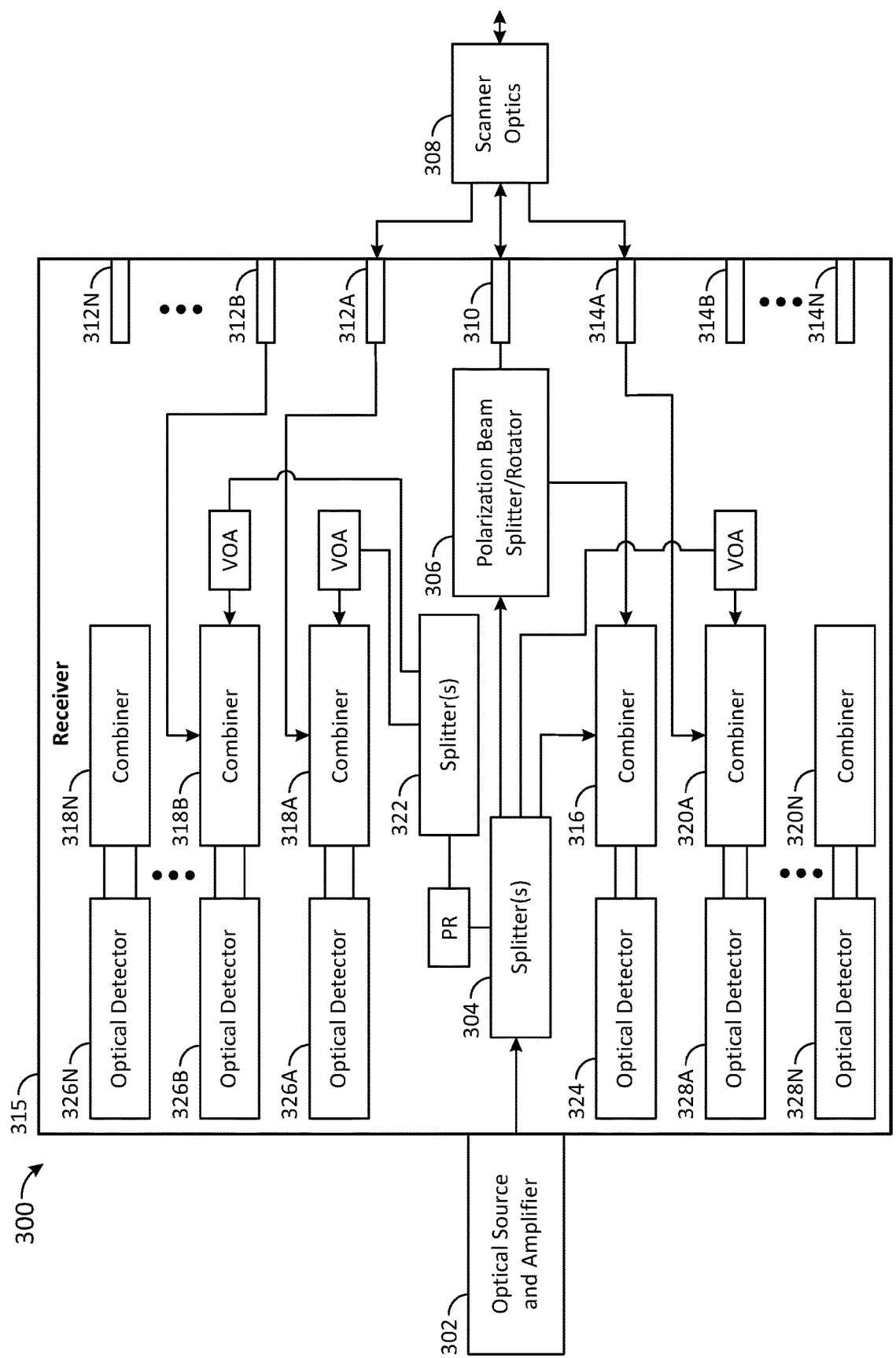
FIG. 3 is a block diagram of an example optical receiver and processing system according to embodiments of the present disclosure.

FIG. 3 illustrates an example of an optical receiver system 300, which may include some or all components depicted in FIG. 1, according to one embodiment. Optical system 300 includes an optical source and amplifier 302 to generate an optical beam and a receiver 315 to transmit the optical beam and receive a returned optical beam. The optical source and amplifier 302 may transmit the optical beam to a splitter 304. The splitter 304 may reflect one or more portions of the optical beam to generate several instances of a local oscillator (LO). The LOs may then be transmitted to a polarizer/rotator (PR) to produce a polarized LO (similar to the polarized beam discussed below). Splitter(s) 322 may receive polarized LO and split the polarized LO into several different LOs to be transmitted to respective combiners 316, 318A-N, and 320A-N. Each LO may then be transmitted to an optical attenuation, such as a variable optical attenuator (VOA) to adjust the power level of each of the LOs provided to combiners 316, 318A-N, and 320A-N.

Although FIG. 3 illustrates that the VOAs are positioned between the corresponding splitters (e.g., 304, 322) and combiners (e.g., 318, 320), as further discussed below, the VOAs may be positioned in various different configurations among different optical components not limited by the illustrations shown in FIG. 3. For example, FIGS. 4, 6, 7, and 9 provide examples of different optional placements of optical attenuators according to the present disclosure.

As described below, each of the LOs are combined with a returned signal at the combiners to generated a beat signal that can then be detected by the optical detectors 324, 326A-N, and 328A-N. The power of each LO may be adjusted to maximize the SNR at the optical detectors 324, 326A-N, and 328A-N, as described with respect to FIGS. 9B, 10C, and 10D below. The splitter 304 may reflect a portion of the optical beam to create the LOs while allowing the majority of the optical beam to be transmitted to a polarization beam splitter/rotator (PBR) 306. The PBR 306 may transform the polarization state and/or rotate the optical beam to produce a polarized optical beam. The polarized optical beam may then be transmitted by a transmitting waveguide to scanner optics 308 of the optical system to be directed towards targets at different locations within the field of view (FOV) of the system 300. The optical beam may then be reflected by a target and returned to the scanner optics 308 to produce a return optical signal. The scanner optics 308 may then focus the returned optical signal on one or more receiving waveguides 310, 312A-N, and 314A-N of the receiver 315 (e.g., a photonics chip). The receiver 315 may include several receiving waveguides 310, 312A-N and 314A-N to receive the returned optical beam and guide the received optical beam to one or more processing components of the system 300.

In some embodiments, scanner optics 308 includes a scanning mirror (not depicted), and may include lenses, PWPs, non-reciprocal elements, and other elements of similar functions. As the scanning speed of the scanning mirror increases (e.g., for high frame rate applications) and target distance, and thus time of travel increase, the mirror may rotate a non-negligible amount before the beam is returned causing the returned beam to be reflected by the scanning mirror at different angles (referred to herein as a "lag angle"). In one embodiment, depending on the lag angle associated with the returned optical beam, the scanner optics may focus the returned optical beam on one or more of the receiving waveguides 310, 312A-N and 314A-N. In one embodiment, the receiving waveguides 310, 312A-N and 314A-N guide the returned optical signal to combiners 316, 318A-N, and 320A-N where the returned optical signal is combined with a particular portion of the LO received from splitter 306 and/or from additional splitters (e.g., splitter(s) 322). The combined signal resulting from combining the LO and the returned signal is then provided to optical detectors 324, 326A-N and 328A-N (e.g., photodetectors).

As depicted, each of the receiving waveguides 310, 312A-N, and 314A-N may guide the returned signal to a single corresponding optical detector 324, 326A-N and 328A-N. For example, for short range targets the lag angle is minimal and the returned beam will be received at the centered waveguide 310. The receiving waveguide 310 may provide the returned signal to optical detector 324, receiving waveguide 312A may provide the returned signal to optical detector 326A, and so forth with each of the corresponding pairs of waveguides and optical detectors. As target distance increases, lag angle increases thereby causing the returned signal to be received at waveguides that are offset from center (e.g., 312A-N or 314A-N). The larger the lag angle, the further the returned beam will be focused away from the center waveguide (e.g., waveguide 310). Therefore, the plurality of waveguides 310, 312A-N, and 314A-N may provide a larger detection FOV for the receiver 315.

Figure 4:
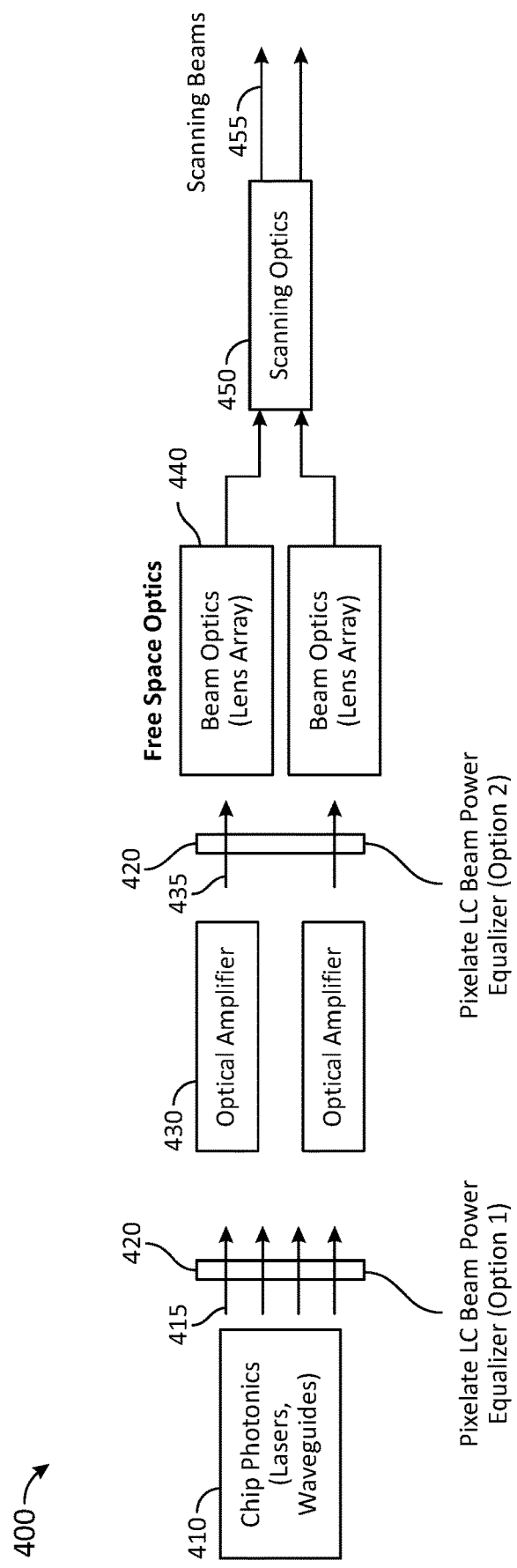
FIG. 4 is a block diagram of an example optical system implementing local oscillator (LO) beams equalization, according to embodiments of the present disclosure.

FIG. 4 is a block diagram of an example optical system 400 implementing local oscillator (LO) beams equalization, according to embodiments of the present disclosure. As shown, the optical attenuator 420 may have at least two options (either one or both) in the optical path. The chip photonics 410 may be an optical source that generates a number of laser beams 415 to transmit to a target (not shown in FIG. 4). For long range applications, a number of optical amplifiers 430 may be used to increase the respective power levels of the laser beams emitted from the chip photonics 410. The amplified beams 435 may then pass through respective beam optics 440 (e.g., a lens array, may also be referred to as free space optics) and through scanning optics 450 to become multiple scanning beams 455.

As shown in FIG. 4, the optical attenuator 420 may optionally be placed in between the chip photonics 410 and the optical amplifiers 430, or between the optical amplifiers 430 and the beam optics 440. The options may be configured based on pixel density of the optical attenuator 420 (e.g., when the optical attenuator 420 uses a pixelate LC plate), beam width of each of the original laser beams or amplified laser beams, and other parameters or factors. In general, the optical attenuator 420 may reduce the power level of the laser beams by inducing transmission loss at a polarized layer using birefringence. The schematic view of the example optical system 400 may further be illustrated by the local views of the optical attenuator 420 in the front view as shown in FIG. 5A, and in the side view as shown in FIG. 5B.

Figure 5A:
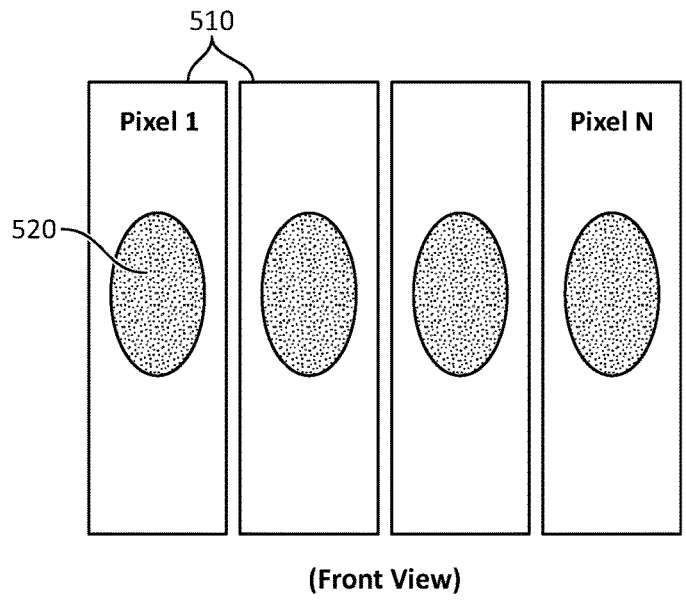
FIGS. 5A-5C illustrate example embodiments of optical attenuators applicable to the optical system of FIG. 4, according to embodiments of the present disclosure.

Turning first to FIG. 5A, as discussed above, in some embodiments, the optical attenuator 420 may include a light transmission medium to reduce a power level of the laser beams in the optical system 400. FIG. 5A illustrates the pixels 1, 2 ... N (labeled 510) of a thin pixelate liquid crystal (LC) plate as the light transmission medium. Each pixel may be individually controlled for each laser beam 520 passing therethrough. In some cases, two or more pixels may be used in the place of the single pixel 510 as illustrated. During operation, each pixel 510 may alter the polarization of the laser beams 520 in response to a voltage input.

Figure 5B:
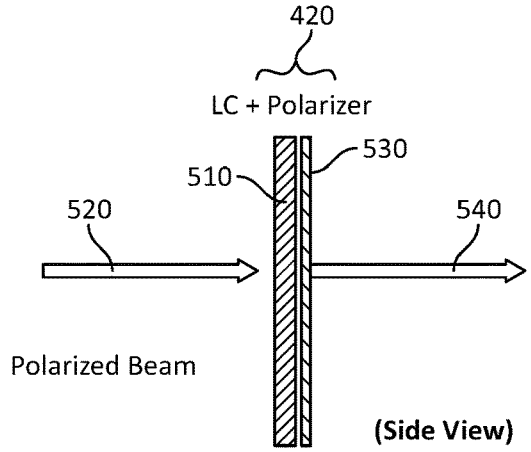

Turning to FIG. 5B, a polarizer 530 (e.g., in the form of a layer or plate) is positioned behind (e.g., relative to the beam traveling direction) and/or coupled with the LC plate 510. The laser beams 520, after polarization by the LC plate 510, may be attenuated by the polarizer 530 when the polarization of the laser beams 520 is not fully aligned with the polarization of the polarizer 530. Each pixel of the LC plate may change the polarization of the laser beams using an optical retardation procedure that rotates the polarization of the laser beam. When the differences of polarization directions between the beams 520 and the polarizer 530 increases, the power level of the output beam 540 decreases (e.g., further attenuated). An example of controlling such attenuation is shown in FIG. 5C.

Figure 5C:
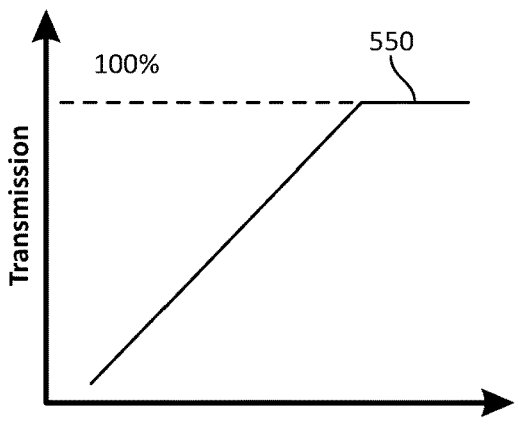

In FIG. 5C, a graph of transmission efficiency 550 of the optical attenuator 420 versus voltage applied thereto is shown. As illustrated, the laser beam is blocked or substantially attenuated when a low voltage is applied to the LC plate 510 (e.g., each pixel thereof). By selectively increasing the voltage, the polarization of the laser beams 520 is rotated to align with the polarization of the polarizer 530, until full alignment where the maximal transmission efficiency (e.g., 100% relative to the total allowed transmission by the optical attenuator 510) is reached.

Figure 6:
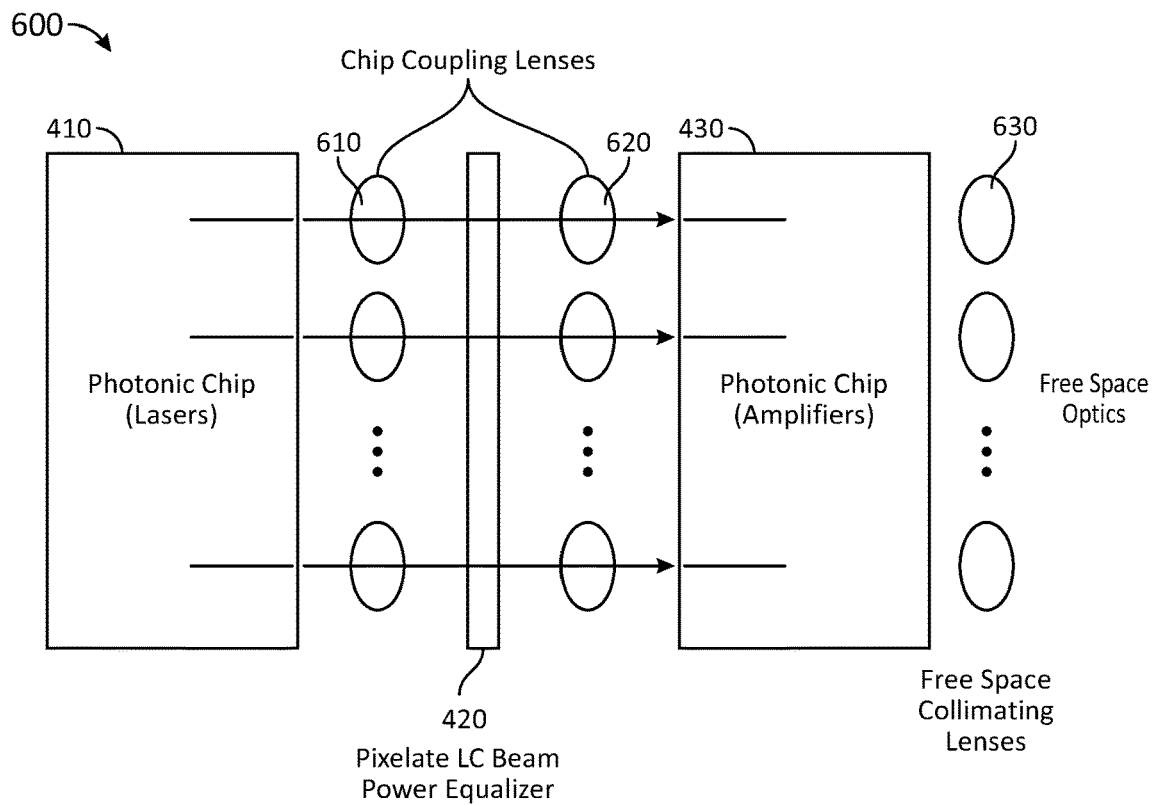
FIG. 6 is a diagram of an example embodiment of optical attenuators applicable to the optical system of FIG. 4, according to embodiments of the present disclosure.

FIG. 6 is a diagram of an example embodiment 600 of optical attenuators 420 applicable to the optical system 400 of FIG. 4, according to embodiments of the present disclosure. As shown, the optical attenuator 420 is placed between the photonic chip 410 for generating multiple laser beams and the amplifier photonic chip 430. A number of respective optics (e.g., chip coupling lenses) 610 and 620 are respectively positioned for each laser beam. For example, the optics 610 on the photonic chip 410 may collimate the multiple laser beams generated therein. The optical attenuator 420 may then individually affect each beam's power level by selectively controlling the respective voltage applied to each pixel (or a set of pixels) corresponding to each of the collimated beam.

For example, a processor (e.g., signal processing unit 112 of FIG. 1) is configured to selectively apply a controlled voltage to each of the pixels corresponding to each laser beam. This adjusted controlled voltage is determined based, at least in part, on feedback received at the optical receiver (e.g., the optical receiver 104 of FIG. 1, the optical detectors 324, 326, and 328, or the photon detector 960 of FIG. 9). The processor determines the respective controlled voltages to maintain a balance of the output beams transmitted through the local oscillators (LO) (e.g., the LO beams of the scanning beams, as further discussed in FIG. 9). The amplified beams may further go through a number of free space collimating lenses 630 and proceed to free space optics for scanning.

Figure 7:
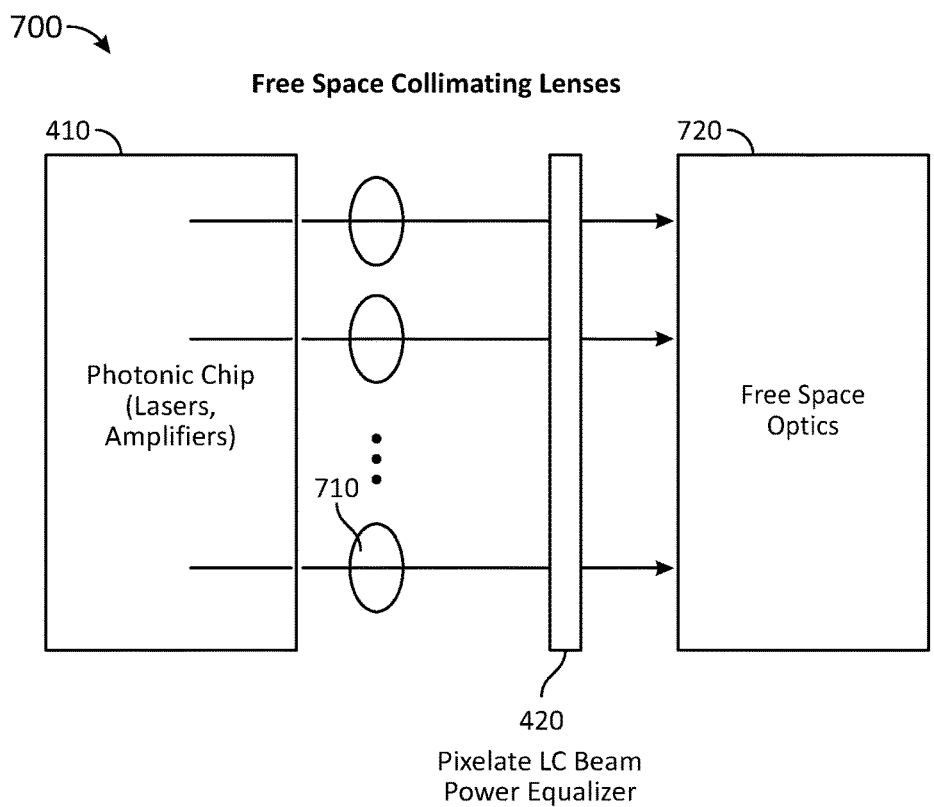
FIG. 7 is a diagram of an example embodiment of optical attenuators applicable to the optical system of FIG. 4, according to embodiments of the present disclosure.

FIG. 7 is a diagram of an example embodiment 700 of optical attenuators applicable to the optical system of FIG. 4, according to embodiments of the present disclosure. The embodiment 700 provides an example where the amplifier photonic chip 430 is not used in the LIDAR system. As shown in FIG. 7, free space collimating lenses 710 may be used to collimate the laser beams generated at the photonic chip 410. The collimated beams then pass the optical attenuator 420 to be balanced based on LO beams received at the optical receivers. The balanced beams then proceed to the free space optics 720.

Figure 8:
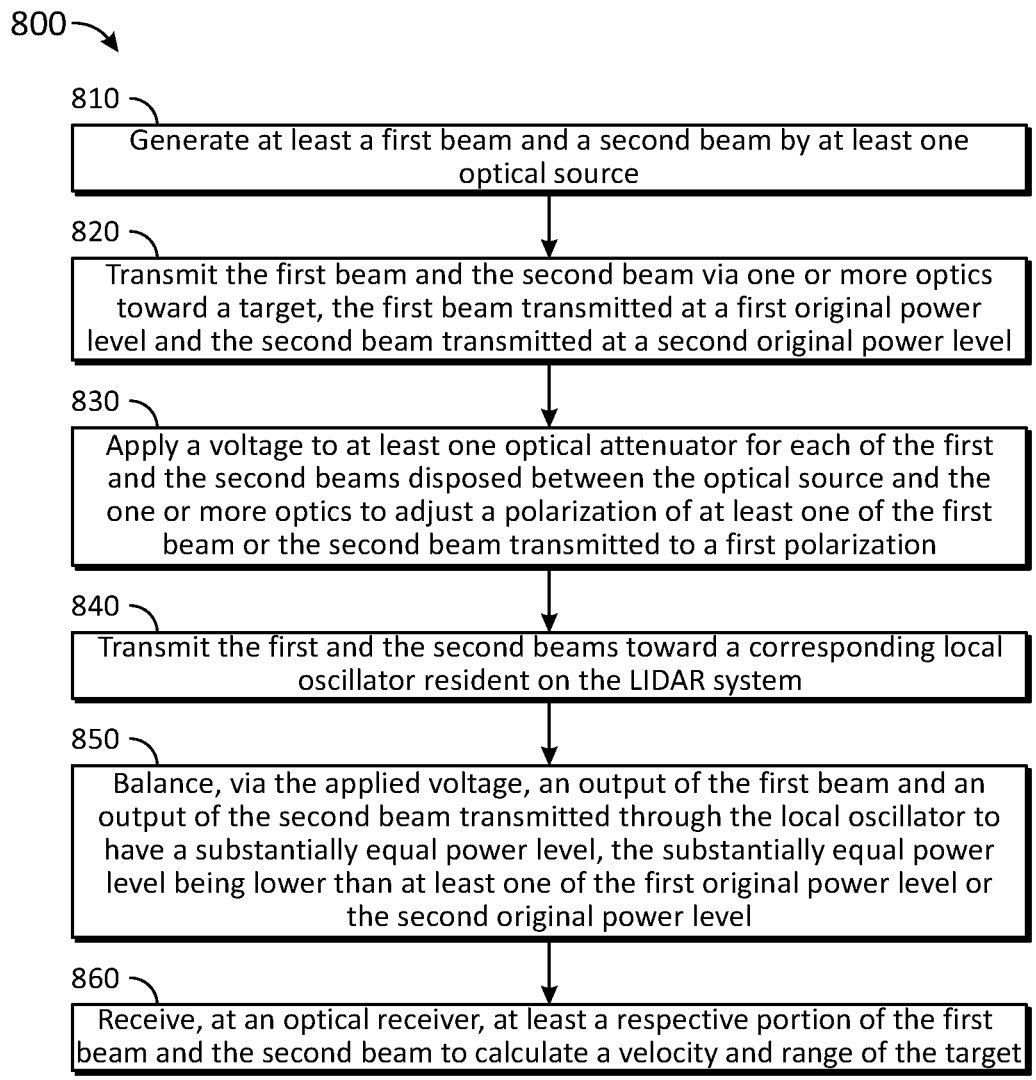
FIG. 8 is a flowchart illustrating an example method for equalizing powers of multiple local oscillator beams using optical attenuators, according to embodiments of the present disclosure.

FIG. 8 is a flowchart illustrating an example method or operation 800 in a LIDAR system for equalizing powers of multiple local oscillator beams using optical attenuators. The method 800 may be performed by a LIDAR system or a processing device in a LIDAR system, such as the LIDAR system 100 or the LIDAR control system 110 of FIG. 1 or the LIDAR system 400 of FIG. 4.

The method 800 begins at 810, by generating at least a first beam and a second beam by at least one optical source. For example, a photonic chip or device may generate multiple laser beams. In some cases, multiple photonic chips or devices may be used to generate multiple laser beams.

At 820, the method 800 continues by transmitting the first and the second beam via one or more optics toward a target. The first beam is transmitted at a first original power level and the second beam is transmitted at a second original power level. For example, the first beam and the second beam may be generated as well as amplified to slightly different original power levels, or may have different original power levels due to various hardware differences (e.g., coatings, optics, and various components that have random errors).

At 830, the method 800 applies a voltage to at least one optical attenuator for each of the first and the second beams disposed between the optical source and the one or more optics to adjust a polarization of at least one of the first beam or the second beam transmitted to a first polarization. For example, the at least one optical attenuator may include a pixelate liquid crystal plate and a polarizer. By adjusting the polarization, a beam may be attenuated when passing through the polarizer.

At 840, the first and the second beams are transmitted toward a corresponding local oscillator (LO) resident on the LIDAR system. For example, an example of the LO may be the LO tap 930a or 930b illustrated in FIG. 9, where it splits a small portion of the laser beam to be used as LO beam.

At 850, the method 800 balances, via the applied voltage, an output of the first beam and an output of the second beam transmitted through the local oscillator to have a substantially equal power level. The substantially equal power level may be lower than at least one of the first original power level or the second original power level. For example, the beam that has a higher power level may be attenuated to be substantially equal to the other beam's power level. When there are two or more beams, the beam having the lowest power level (as received at the optical receiver or photon detector) may be used as the adjustment target for the other beams.

At 860, at least a respective portion of the first beam and the second beam is received, at an optical receiver, to calculate a velocity and range of the target.

In some embodiments, the method 800 may include transmitting, at a layer of the at least one optical attenuator, the output of the first or the second beam toward the optical receiver and block beams having a second polarization different from the first polarization. For example, a power level of the first or the second beam may be reduced by inducing transmission loss at the layer using birefringence.

The transmission loss may be caused by the voltage applied to a light transmission medium of the at least one optical attenuator to change the first polarization.

In some embodiments, the method 800 may include adjusting, by at least one optical attenuator, the polarization of the first beam or the second beam using an optical retardation procedure that rotates one or more portions of the output of the first or the second beam.

In some embodiments, the voltage may be applied by a processor in a closed-loop control, to each optical attenuator for each of the first and the second beams based on feedback received at the optical receiver to maintain a balance of the outputs of the first beam and the second beam transmitted through the local oscillator. For example, each pixel of a multi-pixel attenuator may receive a separate voltage control to affect a corresponding beam. In general, any portion or a set of optical attenuators that may be individually controlled by the voltage may be referred to as an optical attenuator.

Figure 9:
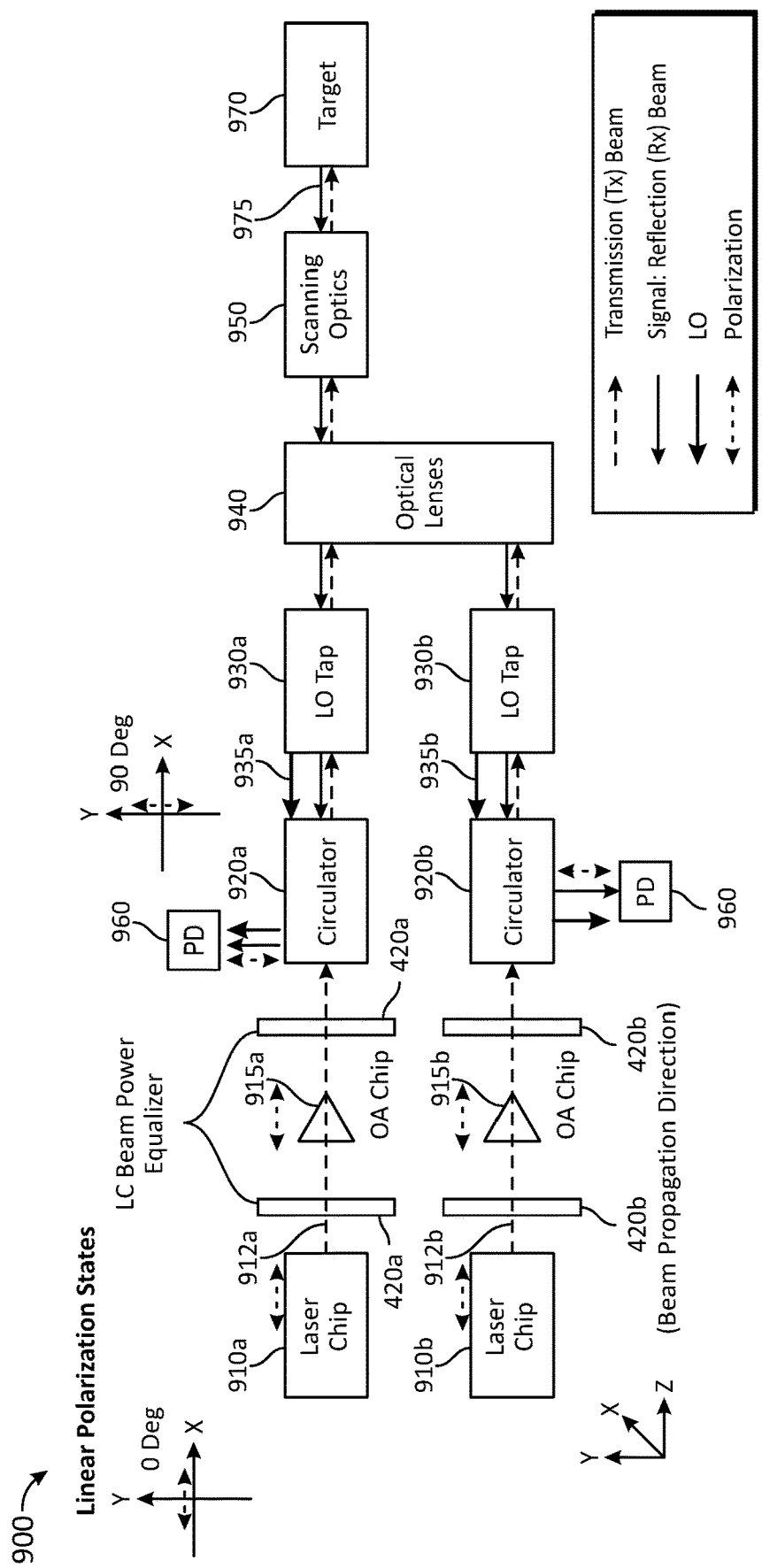
FIG. 9 is a block diagram of a LIDAR system having optical attenuators for equalizing powers of multiple local oscillator beams, according to embodiments of the present disclosure.

FIG. 9 is a block diagram of a LIDAR system 900 having optical attenuators for equalizing powers of multiple local oscillator beams, according to embodiments of the present disclosure. As shown, two or more laser chips 910a and 910b may each generate one or more laser beams 912a and 912b. Although FIG. 9 illustrates two laser chips 910a and 910b, in some embodiments, a single chip (e.g., such as the chip 410 in FIG. 4) may be used to generate multiple laser beams. For long-range operations, amplifiers 915a and 915b may respectively be used to amplify the beams 912a and 912b. The beams 912a and 912b (referred to as transmission beams before reaching the target 970) may then proceed to a number of free space optics, including the circulators 920a and 920b, the LO taps 930a and 930b, the optical lenses 940, and the scanning optics 950 for scanning the target 970. In some cases, the amplifiers 915a and 915b may be omitted or optionally operated.

A respective portion corresponding to each of the transmission beams is then returned from the target 970 toward the LIDAR system. The returned beams are collectively referred to as the reflection beams 975, which returns to the scanning optics 950 and the optical lenses 940 toward a photon detector 960 (e.g., a common photon detector 960). A small portion of each of the reflection beams 975 is split by an optical unbalanced power splitter (referred to as the LO taps 930a and 930b) into an LO beam 935a or 935b. The circulators 920a and 920b direct the reflection beams 975 and the LO beams 935a and 935b to the photon detector 960.

As shown in FIG. 9, the LO beams 935a and 935b may be mixed with measurement signals or the reflection beams 975 and received at the photo detector 960 (e.g., a photodiode). The photo detector 960 converts optical power to electrical current to be processed. The LO taps 930a and 930b are configured to split a small portion of the transmission beam to be used as LO beam.

During operation, the photon detector 960 may compare the power level differences between the LO beams 935a and 935b. Based on the differences, the LIDAR system may control the optical attenuators 420a and 420b for each of the beams 912a and 912b to maintain a balance of outputs of the LO beams 935a and 935b. For example, the LO beams 935a and 935b may be balanced to have a substantially equal power level, such as in terms of signal processing or measurement. The power level may be measured or compared in terms of percentage or dB. In some embodiments, the optical attenuators 420 may achieve high resolution adjustments for each beam, such as, for example, in an adjustment resolution of 0.1-0.5 dB.

Various other adjustment resolutions may be achieved depending on specific application or configuration. In some embodiments, the LIDAR system may execute the control for each pixel or beam by determining a respective voltage based on the detection at the photon detector 960. The voltage may result in the respective different retardation at the optical attenuator 420 (e.g., causing different transmission delays). The retardation may cause a rotation or change in the polarization of the laser beams. The differences between the polarization of the laser beams and the polarizer in the optical attenuator 420 may then decrease the respective transmission power of each laser beam.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operations may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A light detection and ranging (LIDAR) system, comprising:
an optical source to transmit at least a first beam and a second beam toward a target, via one or more optics, the first beam transmitted at a first original power level and the second beam transmitted at a second original power level;
at least one optical attenuator adapted to receive each of the first and the second beams disposed between the optical source and the one or more optics, wherein the at least one optical attenuator is to receive a controlled voltage to adjust a polarization of at least one of the first beam or the second beam to a first polarization, the first and the second beams transmitted toward a corresponding local oscillator resident on the LIDAR system, such that an output of the first beam and an output of the second beam transmitted through the local oscillator are balanced to have a substantially equal power level, the substantially equal power level achieved by lowering one of the first original power level and the second original power level;
an optical receiver adapted to receive at least a respective portion of the first beam and the second beam; and
a signal processing system comprising:
a circuitry; and
a memory to store instructions that, when executed by the circuity, cause the signal processing system to:
calculate a velocity and range of the target based on the respective portion of the first and the second beams.

2. The LIDAR system of claim 1, wherein the at least one optical attenuator comprises:
a layer adapted to impede beams having a second polarization different from the first polarization.

3. The LIDAR system of claim 2, wherein the at least one optical attenuator further comprises a light transmission medium to reduce a power level of the first or the second beam by inducing transmission loss at the layer using birefringence.

4. The LIDAR system of claim 3, wherein the light transmission medium comprises a pixelate thin liquid crystal plate.

5. The LIDAR system of claim 4, wherein the at least one optical attenuator is further adapted to:
adjust the polarization of the first beam or the second beam using an optical retardation procedure that rotates polarizations of one or more portions of the first or the second beam.

6. The LIDAR system of claim 4, further comprising:
a processor adapted to apply the controlled voltage, in a closed-loop control, to each optical attenuator for each of the first and the second beams based on feedback received at the optical receiver to maintain a balance of the outputs of the first beam and the second beam transmitted through the local oscillator.

7. The LIDAR system of claim 1, wherein the at least one optical attenuator comprises at least one of: a liquid crystal optical attenuator, liquid crystal on silicon (LCOS), or micro-electromechanical systems (MEMS).

8. A method for determining target information using a light detection and ranging (LIDAR) system, comprising:
generating at least a first beam and a second beam by at least one optical source;
transmitting the first beam and the second beam via one or more optics toward a target, the first beam transmitted at a first original power level and the second beam transmitted at a second original power level;
applying a voltage to at least one optical attenuator for each of the first and the second beams disposed between the optical source and the one or more optics to adjust a polarization of at least one of the first beam or the second beam transmitted to a first polarization;
transmitting the first and the second beams toward a corresponding local oscillator resident on the LIDAR system;
balancing, via the applied voltage, an output of the first beam and an output of the second beam transmitted through the local oscillator to have a substantially equal power level, the substantially equal power level being lower than at least one of the first original power level or the second original power level; and
receiving, at an optical receiver, at least a respective portion of the first beam and the second beam to calculate a velocity and range of the target.

9. The method of claim 8, further comprising:
transmitting, at a layer of the at least one optical attenuator, the output of the first or the second beam toward the optical receiver and block beams having a second polarization different from the first polarization.

10. The method of claim 9, further comprising:
reducing a power level of the first or the second beam by inducing transmission loss at the layer using birefringence, wherein the transmission loss is caused by the voltage applied to a light transmission medium of the at least one optical attenuator to change the first polarization.

11. The method of claim 8, further comprising:
adjusting, by at least one optical attenuator, the polarization of the first beam or the second beam using an optical retardation procedure that rotates one or more portions of the output of the first or the second beam.

12. The method of claim 8, wherein the at least one optical attenuator comprises at least one of: liquid crystal optical attenuators, liquid crystal on silicon (LCOS), or micro-electromechanical systems (MEMS).

13. The method of claim 8, wherein applying the voltage comprises:
applying, by a processor, in a closed-loop control, the voltage to each optical attenuator for each of the first and the second beams based on feedback received at the optical receiver to maintain a balance of the outputs of the first beam and the second beam transmitted through the local oscillator.

14. A frequency modulated continuous wave (FMCW) light detection and ranging (LIDAR) system, comprising:
at least an optical source to generate a plurality of laser beams to transmit toward a target;
an amplifier to increase one or more original power levels of the plurality of laser beams;
a corresponding optical receiver to receive a portion of each of the plurality of laser beams reflected by the target;
a respective local oscillator disposed between the corresponding optical receiver and the target;
at least one optical attenuator for each of the plurality of laser beams disposed between the optical source and the respective local oscillator, wherein the at least one optical attenuator is to receive a controlled voltage to adjust a polarization of a corresponding one of the plurality of laser beams to a first polarization transmitted toward the respective local oscillator, such that outputs of the plurality of laser beams transmitted through the respective local oscillators are balanced to have a substantially equal power levels; and a signal processing system comprising:
- a circuitry; and
- a memory to store instructions that, when executed by the circuity, cause the signal processing system to: calculate a velocity and range of the target based on the received portions of the plurality of laser beams.

15. The FMCW LIDAR system of claim 14, wherein the at least one optical attenuator further comprises:
a layer adapted to impede beams having a second polarization different from the first polarization.

16. The FMCW LIDAR system of claim 15, wherein the at least one optical attenuator further comprises a light transmission medium to reduce a power level of the first or the second beam by inducing transmission loss at the layer using birefringence.

17. The FMCW LIDAR system of claim 16, wherein the light transmission medium comprises a pixelate thin liquid crystal plate.

18. The FMCW LIDAR system of claim 17, further comprising:
a processor adapted to apply the controlled voltage, in a closed-loop control, to each optical attenuator for each of the plurality of laser beams based on feedback received at the optical receiver to maintain a balance of outputs of the plurality of laser beams transmitted through the local oscillator.

19. The FMCW LIDAR system of claim 14, wherein the at least one optical attenuator is further adapted to:
adjust the polarization of one of the plurality of laser beams using an optical retardation procedure that rotates polarizations of one or more portions of the one of the plurality of laser beams.

20. The FMCW LIDAR system of claim 14, wherein the at least one optical attenuator comprises at least one of: a liquid crystal optical attenuator, liquid crystal on silicon (LCOS), or micro-electromechanical systems (MEMS).

* * * * *